(No Model.)
E. CLIFFORD.
DRYING FRAME FOR COATED CANDIES.
No. 402,406. Patented Apr. 30, 1889.
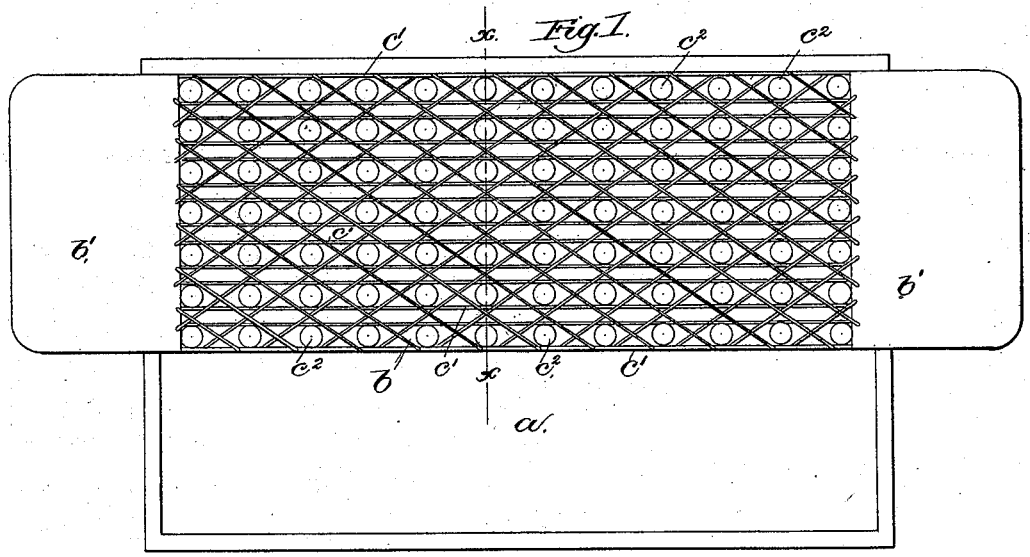
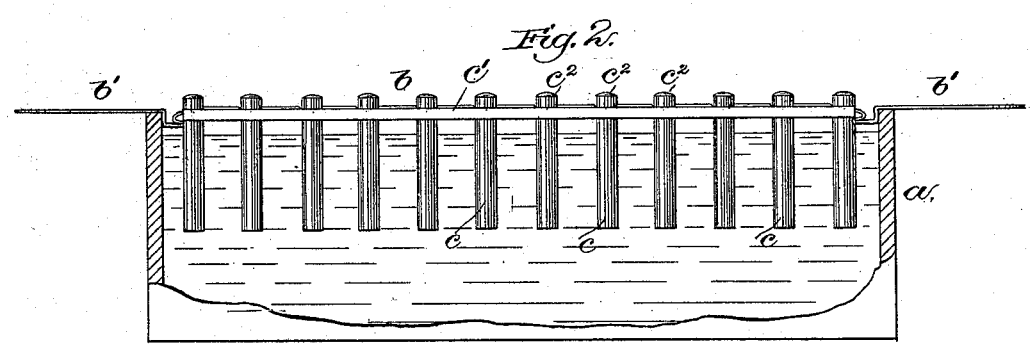
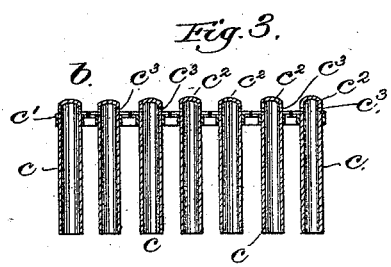
Witnesses.
Fred. S. Greenleaf
Frederick L. Emery
Inventor.
Elizabeth Clifford
by Lemsby & Gregory
Attys.

UNITED STATES PATENT OFFICE.

ELIZBERTH CLIFFORD, OF BOSTON, MASSACHUSETTS.

DRYING-FRAME FOR COATED CANDIES.

SPECIFICATION forming part of Letters Patent No. 402,406, dated April 30, 1889.

Application filed May 10, 1888. Serial No. 273,406. (No model.)

*To all whom it may concern:*

Be it known that I, ELIZBERTH CLIFFORD, of Boston, county of Suffolk, State of Massachusetts, have invented an Improvement in Drying-Frames for Coated Candies, of which the following description, in connection with the accompanying drawings, is a specification, like letters on the drawings representing like parts.

This invention has for its object to construct an apparatus for drying chocolate-drops, it being especially designed for drying chocolate-drops which have been dipped in a chocolate mixture of considerable consistency, such a mixture being employed to cheapen the expense of manufacture.

Heretofore chocolate-drops have been covered with a chocolate mixture comprising cocoa butter, paraffine, and other materials, to cheapen it by a process well known as "hand-rolling," and the mixture was so thick that by the "dipping" process the chocolate coating would dry unevenly, and thereby render the product unsalable.

In accordance with this invention I employ a very thick chocolate mixture, and while hot dip the drops. The dipped or coated drops are then placed on heated posts or rests which serve to keep the drops warm a sufficient length of time to enable the superfluous chocolate coating to run or drain off, thereby leaving a thin film or coating of the chocolate mixture when dry. The heated posts or rests are herein designed to be held in a wire or open-work frame suspended above the usual tray, the posts or rests extending down into the hot chocolate mixture. The posts or rests are made hollow or tubular and provided at the upper end with one or more perforations, thereby enabling the hot chocolate mixture to rise in the posts or rests to keep them warm. The chocolate mixture running off or draining from the drops placed on the posts or rests returns into the tray.

Figure 1 shows in plan view an apparatus for drying chocolate-drops embodying this invention, it being placed in position in a tray; Fig. 2, a side view of the apparatus shown in Fig. 1, one side of the tray being broken away to show the tubes; and Fig. 3, a cross-section of the apparatus shown in Fig. 1, taken on the dotted line $x\ x$, the tray being omitted.

The tray $a$, with which the apparatus herein to be described is employed, is of any usual construction. A wire or open-work frame, $b$, preferably rectangular in shape, is held by ears or leaves $b'$ above the tray, the ears or leaves being turned or bent over the edge of the tray $a$. A series of posts or rests, $c$, are arranged in the frame $b$, being further supported by longitudinal strips $c'$, the parts being soldered together. Each of the posts or rests $c$ is made hollow or tubular, as best shown in Fig. 3, open at the lower end, and provided at the upper end with a slightly-convex cap, $c^2$. The posts or rests are connected with the frame at their upper ends, and the bodies or shanks of the posts extend downwardly into the hot chocolate mixture in the tray $a$. The posts or rests, near their upper ends, are provided with one or more holes, $c^3$, to enable the liquid material contained in the tray to rise in the posts or rests, to thereby keep them warm.

When the frame $b$ is held in position, the posts or rests extend downward nearly to the bottom of the tray $a$.

It is designed that the frame $b$ shall cover only part of the tray, so that an attendant can dip the drops in the tray at the exposed part and then place the drops on the posts or rests.

I do not desire to limit my invention to the particular construction of posts or rests employed, as the essential feature of the invention is the employment of a heated post or rest.

The posts or rests vary in cross-section according to the shape of the drops to be placed thereon.

I claim—

1. In an apparatus for drying coated drops of the kind described, a liquid-holding tray and an open-work frame, combined with several posts or rests, held in said frame and adapted to be heated by the contents of said tray and to support thereon the coated drops, substantially as described.

2. In an apparatus for drying coated drops, several posts or rests, $c$, having convex tops, combined with a support, a frame for said posts or rests, and the longitudinal strips $c'$, substantially as described.

3. In an apparatus for drying coated drops, several tubular or hollow posts or rests, combined with the supporting-frame $b$, through which they pass, substantially as described.

4. In an apparatus for drying coated drops, the tubular or hollow posts or rests having open lower ends, convex upper ends or tops, $c^2$, and one or more vent-openings in the said ends or tops, combined with a liquid-holding tray into which said posts or rests are partially immersed, and a support for said posts or rests above said tray, substantially as described.

In testimony whereof I have signed my name to this specification in the presence of two subscribing witnesses.

ELIZBERTH CLIFFORD.

Witnesses:
BERNICE J. NOYES,
B. DEWAR.